US010368283B2

(12) United States Patent
Ji et al.

(10) Patent No.: US 10,368,283 B2
(45) Date of Patent: Jul. 30, 2019

(54) CONVERGENCE OF CLOUD AND MOBILE ENVIRONMENTS

(71) Applicant: International Business Machines Corporation, Armonk, NY (US)

(72) Inventors: Pei Xing Ji, Shanghai (CN); Xue Ling Mi, Shanghai (CN); Yun Qi Li, Shanghai (CN); Yan Lu, Shanghai (CN); Xiang Zhou, Shanghai (CN); Jin Fan Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 15/141,929

(22) Filed: Apr. 29, 2016

(65) Prior Publication Data

US 2017/0317946 A1 Nov. 2, 2017

(51) Int. Cl.
*G06F 15/16* (2006.01)
*H04W 36/24* (2009.01)
*H04L 29/08* (2006.01)

(52) U.S. Cl.
CPC ............ *H04W 36/24* (2013.01); *G06F 15/16* (2013.01); *H04L 67/10* (2013.01); *H04L 67/1002* (2013.01); *H04L 67/1012* (2013.01)

(58) Field of Classification Search
CPC ..... H04L 47/76; H04L 67/1002; H04W 36/24
USPC ......................................................... 709/226
See application file for complete search history.

(56) References Cited

U.S. PATENT DOCUMENTS

| 6,877,016 | B1 * | 4/2005 | Hart ................... G06F 11/1466 |
| 8,935,317 | B2 | 1/2015 | Jain | |
| 2010/0318999 | A1 | 12/2010 | Zhao et al. | |
| 2012/0197960 | A1 | 8/2012 | An | |
| 2012/0204187 | A1 * | 8/2012 | Breiter ................. G06F 9/5072 |
| | | | | 718/105 |
| 2013/0262644 | A1 * | 10/2013 | Hintermeister ....... G06F 9/5027 |
| | | | | 709/223 |
| 2013/0311836 | A1 * | 11/2013 | Hurst ................... G06F 11/0742 |
| | | | | 714/48 |
| 2014/0024348 | A1 * | 1/2014 | Hurst ................... H04M 3/5232 |
| | | | | 455/414.1 |
| 2014/0095695 | A1 * | 4/2014 | Wang .................... G06F 9/5088 |
| | | | | 709/224 |
| 2015/0205632 | A1 * | 7/2015 | Gaster ................... G06F 9/4843 |
| | | | | 718/102 |
| 2016/0044035 | A1 * | 2/2016 | Huang ................ H04L 63/0272 |
| | | | | 726/4 |

OTHER PUBLICATIONS

Zhou, et al. "A Context Sensitive Offloading scheme for Mobile Cloud Computing Service", 2015 IEEE 8th International Conference on Cloud Computing, 8 pages.

\* cited by examiner

*Primary Examiner* — Sm A Rahman
(74) *Attorney, Agent, or Firm* — Stephanie L. Carusillo (57) ABSTRACT

In an approach for converging a cloud computing environment and a mobile device into an integrated environment, a processor receives a request to complete a computing task on a first device. A processor identifies capabilities of the first device. A processor monitors resource utilization on the first device. A processor determines that the computing task should be offloaded based, at least in part, on the capabilities of the first device and resource utilization on the first device. A processor offloads the computing task. A processor receives a result of the computing task.

15 Claims, 5 Drawing Sheets

CONVERGENCE OF CLOUD AND MOBILE ENVIRONMENTS

BACKGROUND

The present invention relates generally to the field of mobile and cloud computing, and more particularly to real-time resource identification and monitoring to determine whether to offload a computing task from mobile to cloud or cloud to mobile.

Mobile computing is human-computer interaction by which a computer, transmitting data, voice, and video, is expected to be transported during normal usage.

Cloud computing is a kind of Internet-based computing that provides shared processing resources and data to computers and other devices on demand. It is a model for enabling ubiquitous, on-demand access to a shared pool of configurable computing resources (e.g., networks, servers, storage, applications, and services), which can be rapidly provisioned and released with minimal management effort. Cloud computing and storage solutions provide users and enterprises with various capabilities to store and process their data in third-party data centers. Cloud computing relies on sharing of resources to achieve coherence and economy of scale, similar to a utility (e.g., the electricity grid) over a network.

SUMMARY

Aspects of an embodiment of the present invention disclose a method, computer program produce, and computer system for converging a cloud computing environment and a mobile device into an integrated environment. A processor receives a request to complete a computing task on a first device. A processor identifies capabilities of the first device. A processor monitors resource utilization on the first device. A processor determines that the computing task should be offloaded based, at least in part, on the resource utilization on the first device and the capabilities of the first device. A processor offloads the computing task. A processor receives a result of the computing task.

DETAILED DESCRIPTION

Embodiments of the present invention recognize the growing amount and variety of computing tasks asked of cloud computing environments and mobile devices. In some instances, a cloud computing environment or mobile device can become overloaded with computing tasks, and then performance in completing these computing tasks will suffer. In other instances, a cloud computing environment or mobile device may not have the needed resource, such as a sensor, to complete a computing task. Embodiments of the present invention provide solutions by identifying capabilities and monitoring current resource utilization of mobile devices and cloud computing environments. Based on this, as discussed in greater detail herein, embodiments of the present invention determine whether to offload a computing task from a mobile device to a cloud computing environment, from a cloud computing environment to a mobile device, and from a mobile device to a cloud computing environment to a different mobile device to provide enhanced performance of cloud computing environments and mobile devices. This integrated computing environment enables on-demand sharing of resources and on-demand load sharing capabilities between a cloud computing environment and mobile devices.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, cnetworks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

The present invention will now be described in detail with reference to the Figures.

Figure 1:
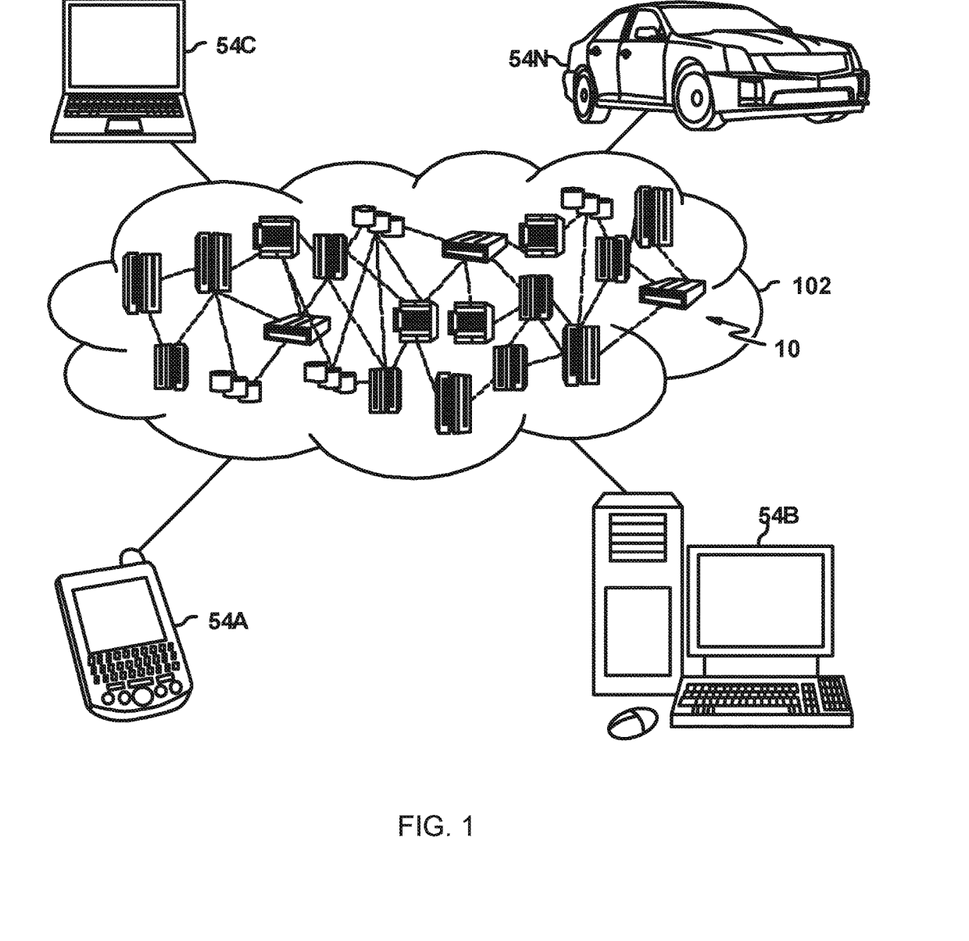
FIG. 1 depicts a cloud computing environment according to an embodiment of the present invention.

In FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
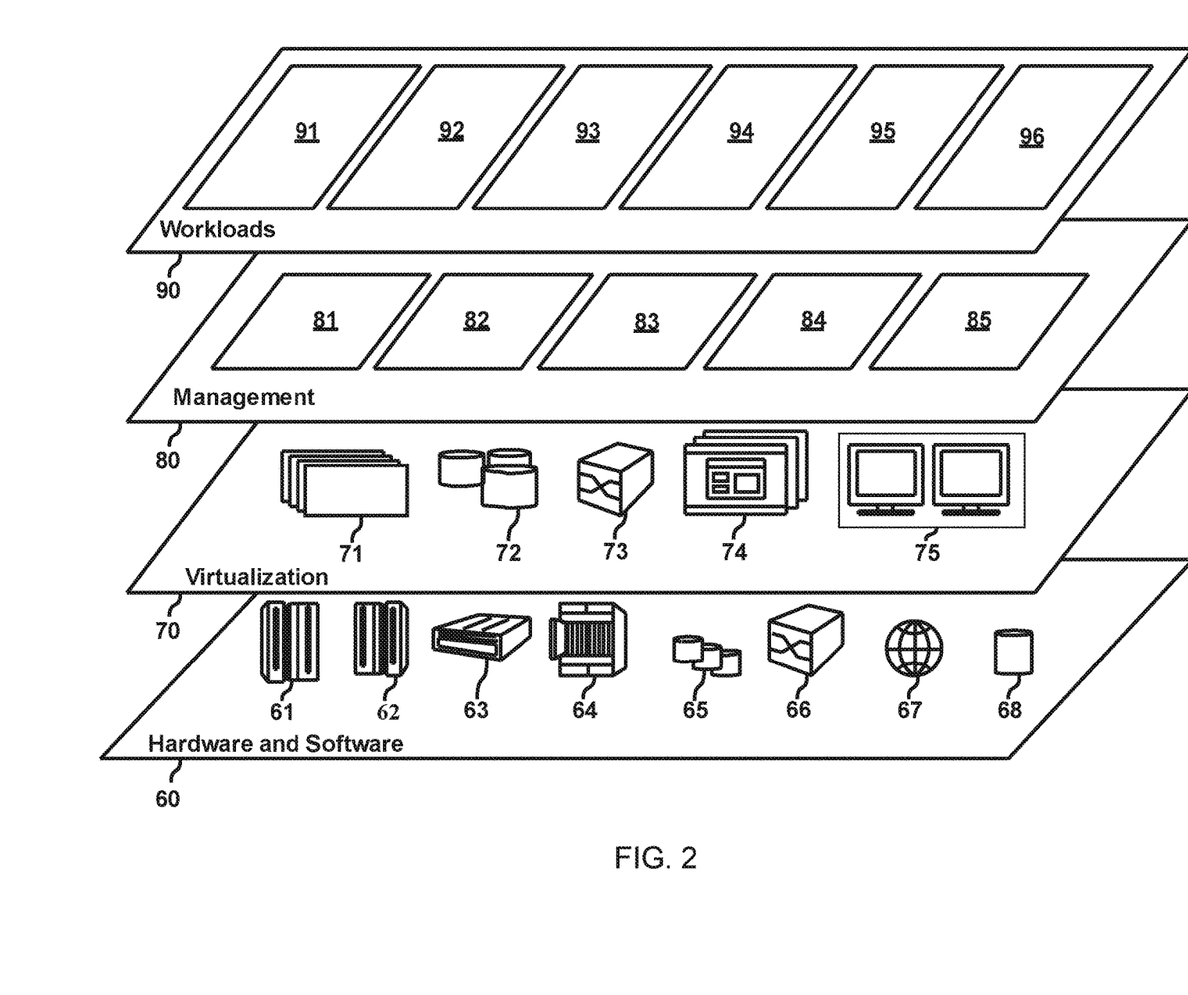
FIG. 2 depicts abstraction model layers according to an embodiment of the present invention.

In FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95.

Figure 3:
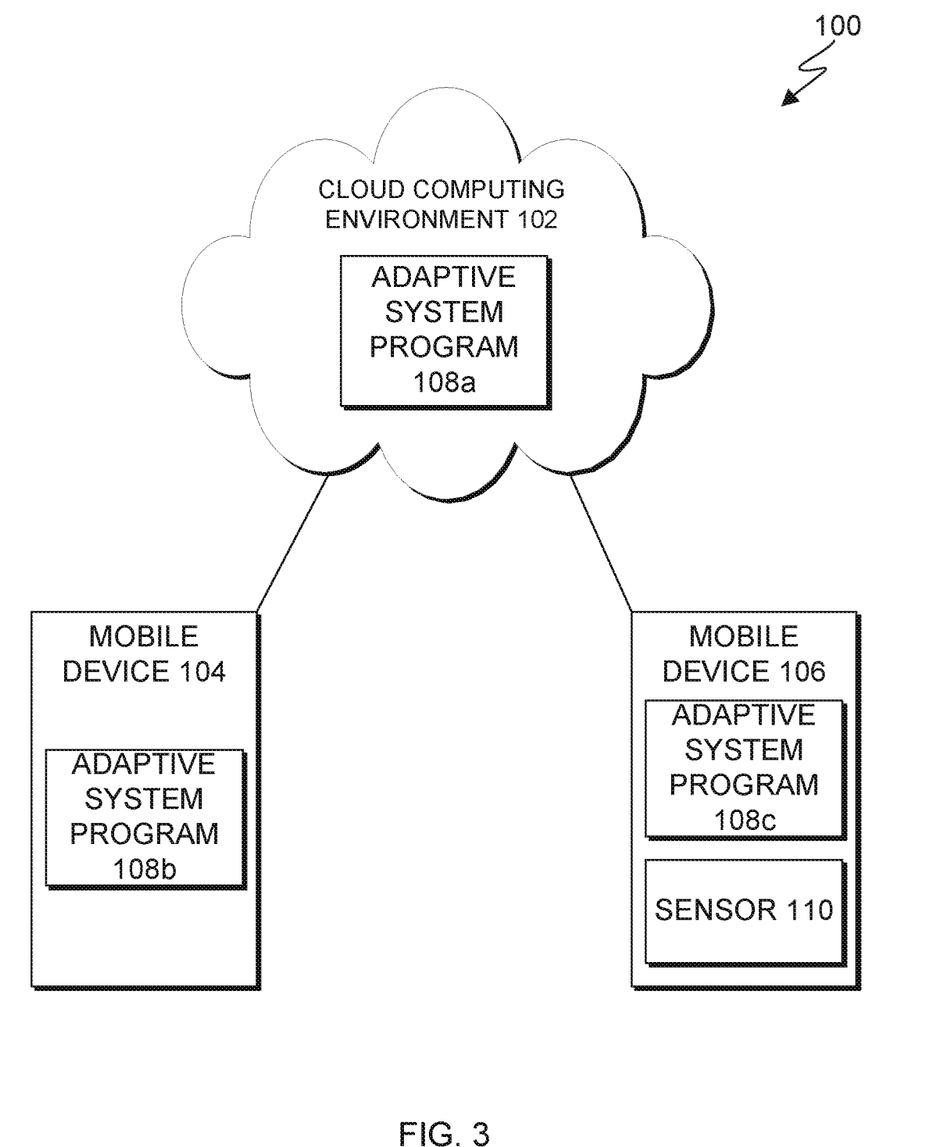
FIG. 3 is a functional block diagram illustrating an integrated cloud and mobile environment, in accordance with an embodiment of the present invention.

FIG. 3 is a functional block diagram illustrating a computing environment 100, in accordance with an embodiment of the present invention. FIG.3 provides only an illustration of one embodiment and does not imply any limitations with regard to the environments in which different embodiments may be implemented.

In the depicted embodiment, computing environment 100 includes cloud computing environment 102, mobile device 104, and mobile device 106 interconnected over a network (not shown). The network may be a local area network (LAN), a wide area network (WAN) such as the Internet, the public switched telephone network (PSTN), any combination thereof, or any combination of connections and protocols that will support communications between cloud computing environment 102, mobile device 104, and mobile device 106, in accordance with embodiments of the invention. The network may include wired, wireless, or fiber optic connections.

Cloud computing environment 102 operates to complete computing tasks and includes adaptive system program 108*a*. Cloud computing environment 102 functions as described hereinabove in the FIG. 1 and FIG. 2 descriptions. Cloud computing environment 102 can communicate with any type of computerized device over any type of network and/or network addressable connection (e.g., using a web browser).

Mobile device 104 operates to complete computing tasks and includes adaptive system program 108*b*. Mobile device 106 operates to complete computing tasks and includes adaptive system program 108*c*. Mobile device 104 and mobile device 106 can be laptop computers, tablet computers, smart phones, or any portable programmable electronic device capable of receiving and sending data and communicating with each other via a network. In general, mobile device 104 and mobile device 106 are representative of any electronic devices, or combination of electronic devices, capable of executing machine-readable program instructions, as described in greater detail with regard to FIG. 5. Computing environment 100 may include additional computing devices, servers, computers, mobile devices, or other devices not shown.

Adaptive system program 108*a*, 108*b*, and 108*c* collectively operate to determine whether a computing task should be offloaded based, at least in part, on current resource utilization and device capability. Adaptive system program 108 refers to an instance of adaptive system program, generally, while 108*a*, 108*b*, and 108*c* refer to adaptive system program running on a specific local computing device or specific computing environment, as depicted in FIG. 3. In the depicted embodiment, adaptive system program 108*a* identifies capabilities of cloud computing environment 102 and monitors the current resource utilization of cloud computing environment 102. In the depicted embodiment, adaptive system program 108*b* identifies capabilities of mobile device 104 and monitors current resource utilization of mobile device 104. In the depicted embodiment, adaptive system program 108*c* identifies capabilities of mobile device 106 and monitors current resource utilization of mobile device 106. A resource of a cloud computing environment or mobile device may include, but is not limited to, its CPU, memory, battery, network, and sensors. In some embodiments, when adaptive system program 108 receives a request to complete a computing task, adaptive system program 108 determines whether the computing task should be offloaded based, at least in part, on device capability and current resource utilization. In some embodiments, adaptive system program 108 resides on cloud computing environment 102, mobile device 104, and mobile device 106. In other embodiments, adaptive system program 108 may reside on another cloud computing environment, or another mobile device (not shown), provided that adaptive system program 108 has access to location identifying information associated with cloud computing environment 102, mobile device 104, and mobile device 106.

Sensor 110 operates to measure physical qualities associated with a mobile device or cloud computing environment. A sensor measures physical qualities such as, but not limited to, temperature, light, heat, pressure, sound, and location. Sensor 110 is a resource that is identified by adaptive system program 108. In the depicted embodiment, sensor 110 is located on mobile device 106 and measures physical qualities associated with mobile device 106. In some embodiments, sensor 110 may reside on cloud computing environment 102, mobile device 104, and mobile device 106. In other embodiments, sensor 110 may reside on another cloud computing environment, or another mobile device (not shown).

Figure 4:
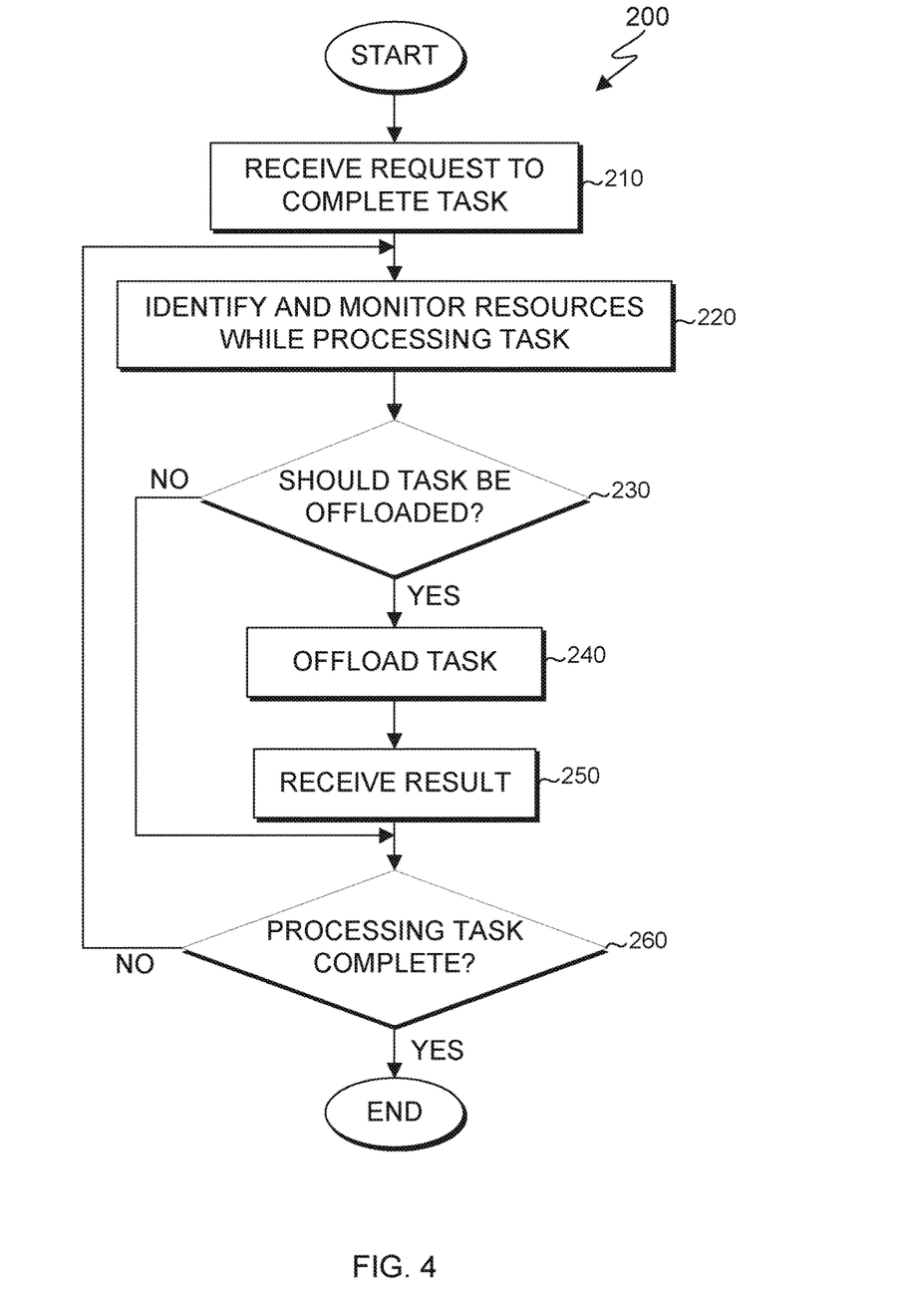
FIG. 4 is a flowchart depicting operational steps of an adaptive system program installed on the cloud and mobile environment of FIG. 3, in accordance with an embodiment of the present invention.

FIG. 4 depicts a flowchart 200 of the steps of adaptive system program 108 executing within converged cloud and mobile environment of FIG. 3, in accordance with an embodiment of the present invention. In the depicted embodiment, adaptive system program 108 operates to determine whether a computing task should be offloaded based, at least in part, on device capability and current resource utilization.

In step 210, adaptive system program 108 receives a request to complete a task. In the depicted embodiment, for example, adaptive system program 108 receives a request to complete a computing task on cloud computing environment 102, mobile device 104, or mobile device 106. A computing task, or task, can be, but is not limited to, a unit of execution, unit of work, unit of computation, set of actions, process, step, request, or query for work. For example, when a user of mobile device 104 selects a weather application icon, adaptive system program 108*b* receives a request on mobile device 104 to open the weather application and generate the weather forecast for the user's current location. In some embodiments, completion of a task may require completion of multiple units of execution, units of work, units of computation, sets of actions, processes, steps, requests, or queries for work. For the weather application example, generating the weather forecast for the user's current location entails determining a current temperature for the city, a daily forecast for the city, and generating a current precipitation radar map for the city. In some embodiments, a task requires a sensor, such as sensor 110, to complete the task. For the weather application example, generating the weather forecast requires a temperature sensor to determine the current temperature of the user's current location.

In step 220, adaptive system program 108 identifies and monitors resources while processing the task. In the depicted embodiment, adaptive system program 108 identifies the resources of cloud computing environment 102, mobile device 104, and mobile device 106. In the depicted embodiment, adaptive system program 108 monitors the resources of cloud computing environment 102, mobile device 104, and mobile device 106. In some embodiments, adaptive system program 108 monitors, in real-time, the usage and availability of resources on cloud computing environment 102, mobile device 104, and mobile device 106. For the weather application example, adaptive system program 108*b* will identify and monitor in real-time the usage and availability of resources on mobile device 104.

In some embodiments, adaptive system program 108 processes a task by identifying the individual units or steps of the task. In some embodiments, adaptive system program 108 identifies what resources are needed to complete each unit of the task. For the weather application example, adaptive system program 108*b* will process the request to determine the current temperature for the city, generate a daily forecast for the city, and generate a current precipitation radar map for the city. Adaptive system program 108*b* will identify three units of the task as (1) determining the current temperature for the city, (2) generating a daily forecast for the city, and (3) generating a current precipitation radar map for the city. Then, adaptive system program 108*b* will identify what resources are needed for these units of the task.

In decision 230, adaptive system program 108 determines whether the task should be offloaded. For a task that includes multiple units, adaptive system program 108 will determine whether each unit of the task, separately, should be offloaded. In this embodiment, adaptive system program 108 determines whether to offload the task based, at least in part, on the identification of required resources and the monitored current resource utilization (see step 220). Reasons to offload a task include, but are not limited to, an overloaded processor, low battery power, data usage limits, and lack of a required type of sensor to perform the task. For the weather application example, adaptive system program 108 determines that mobile device 104 lacks the required temperature sensor to generate the weather forecast, therefore, the task should be offloaded. If in decision 230, adaptive system program 108 determines the task should be offloaded, then, adaptive system program 108 will offload the task (see step 240). If in decision 230, adaptive system program 108 determines the task should not be offloaded, then, adaptive system program 108 will determine whether the processing of the task has been completed (see decision 260).

Continuing the weather application example, if adaptive system program 108b determines from monitoring mobile device 104 that mobile device 104 has a low battery, adaptive system program 108b may determine that the computing task of generating the radar map should be offloaded to cloud computing environment 102. This may, for example, conserve battery life by reducing processor utilization. Then, if adaptive system program 108a determines from monitoring cloud computing environment 102 that cloud computing environment 102 does not have the necessary type of sensor (e.g., a temperature sensor) to determine the current temperature for the city, adaptive system program 108a will offload the computing task of determining the current temperature to mobile device 106, which does have the necessary type of sensor, sensor 110.

In step 240, adaptive system program 108 offloads the task. In some embodiments, adaptive system program 108 uses remote method invocation to offload the task to a cloud computing environment or mobile device. Remote method invocation allows objects to access data and invoke methods on remote objects. In some embodiments, adaptive system program 108 uses dynamic remote method invocation, which is a method that is calculated at runtime then defined, to offload the task to a cloud computing environment or mobile device. In some embodiments, adaptive system program 108 can automatically filter, reconstruct, and deploy a task's functional unit code to a cloud computing environment or mobile device. In a first embodiment, where the task originated on mobile device 104, adaptive system program 108b offloads the task to cloud computing environment 102. In a second embodiment, where the task originated on cloud computing environment 102, adaptive system program 108a offloads the task to a mobile device, which, in this embodiment, could be mobile device 104 or mobile device 106. In a third embodiment, where the task originated on mobile device 104, adaptive system program 108b offloads the task to cloud computing environment 102, and then, adaptive system program 108a offloads the task to mobile device 106. For the weather application example, adaptive system program 108b offloads the computing task of generating the weather forecast to cloud computing environment 102. Then, adaptive system program 108a offloads part of the task, determining the current temperature of the city, to mobile device 106, which has the necessary type of sensor, sensor 110.

In step 250, adaptive system program 108 receives a result. In the first embodiment, adaptive system program 108b receives a result of the task from cloud computing environment 102. In the second embodiment, adaptive system program 108a receives a result of the task from mobile device 104 or mobile device 106. In the third embodiment, adaptive system program 108a receives a result of the task from mobile device 106, and then, adaptive system program 108b receives the result of the task from cloud computing environment 102. For the weather application example, adaptive system program 108a receives the current temperature of the city from mobile device 106 and adaptive system program 108a sends the current temperature data to mobile device 104 where the user, who originally requested the task, can view the current temperature in the weather application.

In decision 260, adaptive system program 108 determines whether the processing of the task has been completed. In some embodiments where the task is made up of several units of work, adaptive system program 108 can determine whether all the units of work have been completed or whether it needs to determine whether another unit of work should be offloaded. If, in decision 260, adaptive system program 108 determines the processing of the task has been completed (decision 260, yes branch), then, adaptive system program 108 will end. Adaptive system program 108 may determine that the processing of the task has been completed if, for example, the task is the execution of a computer program and the computer program has completed execution, or has been closed. If in decision 260, adaptive system program 108 determines the processing of the task has not been completed (decision 260, no branch), then adaptive system program 108 will proceed to continue to identify and monitor resources while processing the task (see step 220). Adaptive system program 108 may determine that the processing of the task has not been completed if, for example, the task is the execution of a computer program and the computer program continues to execute.

Figure 5:
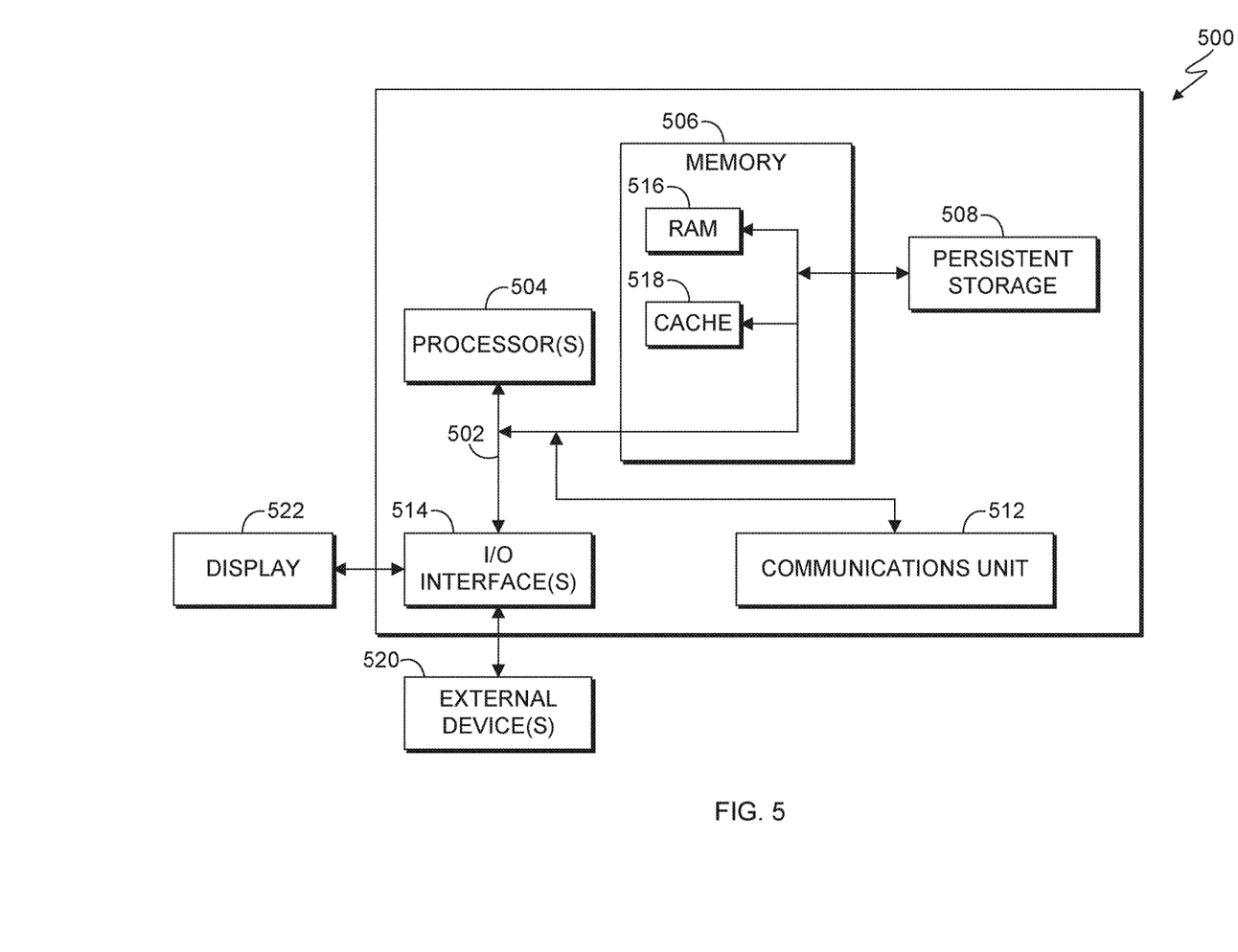
FIG. 5 depicts a block diagram of components of the cloud and mobile executing the adaptive system program, in accordance with an embodiment of the present invention.

FIG. 5 depicts a block diagram of components of computing environment 100 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing environment 100 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Adaptive system program 108 is stored in persistent storage 508 for access and/or execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of mobile device 104, mobile device 106, and cloud computing environment 102. In these examples, communications unit 510 includes one or more network interface cards. Communications unit 510 may provide communications through the use of either or both physical and wireless communications links. Adaptive system program 108 may be downloaded to persistent storage 508 through communications unit 510.

I/O interface(s) 512 allows for input and output of data with other devices that may be connected to computing environment 100. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., Adaptive system program 108, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, by one or more processors, a request to complete a computing task on a first device, wherein:
      the first device comprises at least a portion of a cloud computing environment,
      the request to complete the computing task originates from a second device, and
      the computing task requires a physical sensor;
   identifying, by one or more processors, one or more capabilities of the first device, wherein a first capability of the one or more capabilities is identified based, at least in part, on whether the first device has the physical sensor;
   determining, by one or more processors, that the computing task should be offloaded from the first device to a third device based, at least in part, on the first device lacking the physical sensor and the third device having the physical sensor;
   offloading, by one or more processors, the computing task from the first device to the third device;
   receiving, by one or more processors, a result of the computing task from the third device; and
   sending, by one or more processors, the result of the computing task from the first device to the second device.

2. A computer program product comprising:
   one or more computer readable storage media and program instructions stored on the one or more computer readable storage media, the program instructions comprising:
   program instructions to receive a request to complete a computing task on a first device, wherein:
      the first device comprises at least a portion of a cloud computing environment,
      the request to complete the computing task originates from a second device, and
      the computing task requires a physical sensor;
   program instructions to identify one or more capabilities of the first device, wherein a first capability of the one or more capabilities is identified based, at least in part, on whether the first device has the physical sensor;
   program instructions to determine that the computing task should be offloaded from the first device to a third device based, at least in part, on the first device lacking the physical sensor and the third device having the physical sensor;
   program instructions to offload the computing task from the first device to the third device;
   program instructions to receive a result of the computing task from the third device; and
   program instructions to send the result of the computing task from the first device to the second device.

3. A computer system comprising:
   one or more computer processors;
   one or more computer readable storage media;
   program instructions stored on the computer readable storage media for execution by at least one of the one or more processors, the program instructions comprising:
   program instructions to receive a request to complete a computing task on a first device, wherein:

the first device comprises at least a portion of a cloud computing environment, the request to complete the computing task originates from a second device, and the computing task requires a physical sensor;

program instructions to identify one or more capabilities of the first device, wherein a first capability of the one or more capabilities is identified based, at least in part, on whether the first device has the physical sensor;

program instructions to determine that the computing task should be offloaded from the first device to a third device based, at least in part, on the first device lacking the physical sensor and the third device having the physical sensor;

program instructions to offload the computing task from the first device to the third device;

program instructions to receive a result of the computing task from the third device; and program instructions to send the result of the computing task from the first device to the second device.

4. The method of claim 1, further comprising:

monitoring, by one or more processors, resource utilization on the first device, wherein resource utilization comprises at least one of processing power, battery power, and data usage.

5. The computer program product of claim 2, further comprising:

program instructions to monitor resource utilization on the first device, wherein resource utilization comprises at least one of processing power, battery power, and data usage.

6. The computer system of claim 3, further comprising:

program instructions to monitor resource utilization on the first device, wherein resource utilization comprises at least one of processing power, battery power, and data usage.

7. The method of claim 1, wherein the second device is a mobile device.

8. The computer program product of claim 2, wherein the second device is a mobile device.

9. The computer system of claim 3, wherein the second device is a mobile device.

10. The method of claim 1, wherein the third device is a mobile device.

11. The computer program product of claim 2, wherein the third device is a mobile device.

12. The computer system of claim 3, wherein the third device is a mobile device.

13. The method of claim 1, further comprising:

identifying, by one or more processors, a set of units of the computing task; and identifying, by one or more processors, a set of resources and a set of capabilities needed to complete each unit of the set of units of the computing task.

14. The computer program product of claim 2, further comprising:

program instructions to identify a set of units of the computing task; and program instructions to identify a set of resources and a set of capabilities needed to complete each unit of the set of units of the computing task.

15. The computer system of claim 3, further comprising:

program instructions to identify a set of units of the computing task; and program instructions to identify a set of resources and a set of capabilities needed to complete each unit of the set of units of the computing task.

* * * * *